С006534580B1

(12) United States Patent
Hanada et al.

(10) Patent No.: US 6,534,580 B1
(45) Date of Patent: Mar. 18, 2003

(54) RESIN MATERIALS AND FILMS MADE THEREFROM

(75) Inventors: Satoshi Hanada, Ibaraki (JP); Ryuma Kuroda, Ibaraki (JP); Taiichi Sakaya, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/424,191

(22) PCT Filed: May 7, 1998

(86) PCT No.: PCT/JP98/02018

§ 371 (c)(1),
(2), (4) Date: Nov. 5, 1999

(87) PCT Pub. No.: WO98/50466

PCT Pub. Date: Nov. 12, 1998

(30) Foreign Application Priority Data

May 7, 1997 (JP) .............................................. 9-116839

(51) Int. Cl.⁷ .......................... C08K 5/053; C08L 23/26
(52) U.S. Cl. ........................ 524/377; 524/386; 524/387; 524/388; 524/247
(58) Field of Search ................................ 524/377, 386, 524/387, 388, 247

(56) References Cited

U.S. PATENT DOCUMENTS

| | | | |
|---|---|---|---|
| 4,135,026 A | | 1/1979 | Hoyt et al. |
| 4,572,854 A | * | 2/1986 | Dallmann et al. ............. 428/35 |
| 5,292,782 A | * | 3/1994 | Bastioli et al. ................ 524/47 |
| 5,384,187 A | * | 1/1995 | Uemura et al. .............. 428/262 |
| 5,412,005 A | * | 5/1995 | Bastioli et al. ................ 524/47 |
| 5,534,150 A | * | 7/1996 | Bastioli et al. ............. 210/640 |
| 5,958,313 A | * | 9/1999 | Yamamoto et al. ........... 264/39 |

FOREIGN PATENT DOCUMENTS

| | | |
|---|---|---|
| EP | 0 425 820 A2 | 5/1991 |
| EP | 0 545 312 A1 | 6/1993 |
| JP | 60-76325 | 4/1985 |
| JP | 61-4752 | 1/1986 |
| JP | 3-227344 | 10/1991 |
| JP | 5-200865 | 8/1993 |

\* cited by examiner

*Primary Examiner*—D. R. Wilson
(74) *Attorney, Agent, or Firm*—Fitch, Even, Tabin & Flannery

(57) ABSTRACT

A resin material comprising a resin, which satisfies at least one relationship selected from the group consisting of the following relationships [I] and [II] is provided:

$$\ln(OTR/22.5)+4.78\ln(Fy/Fy')<-0.13, \text{ and } T_2-T_1\leq 20 \quad [I]$$

in which Fy' is a yield strength of a standard saponified ethylene-vinyl acetate copolymer at 60° C.; Fy is a yield strength of the resin material at 60° C.; OTR is an oxygen gas permeability (cc/m²·day·atm) of the resin material per a unit thickness of 1 μm at 23° C. and a relative humidity of 0%; $T_1$ is a haze (%) of a film of the resin material having a thickness of 30 μm after being maintained at 23° C. and a relative humidity of 48% for 48 hours; and $T_2$ is a haze (%) of a film of the resin material having a thickness of 30 μm after being maintained at 40° C. and a relative humidity of 90% for 24 hour, and $$\ln(OTR/22.5)+0.0698(T_{im}-157)<-0.06 \quad [II]$$

in which OTR is an oxygen gas permeability (cc/m²·day·atm) of the resin material per a unit thickness of 1 μmat 23° C. and a relative humidity of 0%; and $T_{im}$ is a melting point of the resin material.

25 Claims, No Drawings

RESIN MATERIALS AND FILMS MADE THEREFROM

This application is the national phase of international application PCT/JP98/02018 filed May 7, 1998 which designated the U.S.

FIELD OF THE INVENTION

The present invention relates to a resin material having gas barrier properties and a film comprising the same.

DESCRIPTION OF BACKGROUND ART

Shrink packaging using a stretched film (a heat-shrinkable film) is widely used in industrial packaging such as packaging of foods, medicines, industrial parts, and the like. For example, a content is packaged by inserting the content in the bag of a stretched film, optionally evacuating an air from the bag, sealing the opening of the bag, and then heating the bag to shrink the stretched film.

A film used in such shrink packaging is desired to shrink sufficiently by heating. Furthermore, it is desired to lower a temperature at which a film can be thermally shrunk from the viewpoint of the reduction of packaging process cycles.

A stretched film should be heated to a temperature higher than a stretching temperature encountered in the production of the stretched film to thermally shrink the stretched films. Thus, it is assumed that the thermally shrinking temperature of the stretched film may depend on a stretching temperature encountered in the production of the stretched film.

Saponified ethylene-vinyl ester copolymers have better transparency and gas barrier properties, in particular, against oxygen gas, than other resins. Therefore, the films of such saponified copolymers are widely used in industrial packaging.

However, the saponified ethylene-vinyl ester copolymers, in particular, saponified ethylene-vinyl acetate copolymers, have high stiffness and thus less stretchability, in particular, at a low temperature, they should be stretched at a relatively high temperature. If they are stretched at a low temperature, they are split, unevenly stretched or whitened, and thus stretched films having insufficient properties are obtained. Accordingly, it is desired to improve the stretchability of saponified ethylene-vinyl ester copolymers.

For example, JP-A-53-88067 and JP-A-59-20345 describe the improvement of the stretchability of saponified ethylene-vinyl ester copolymers by the addition of various plasticizers. However, the improvement of the stretchability of saponified ethylene-vinyl ester copolymers by such conventional methods are still unsatisfactory.

Hitherto, Nylon, polyvinylidene chloride, polyvinyl alcohol, liquid crystal polymers and the like are used as gas barrier materials. However, it is known that Nylon and polyvinyl chloride have inferior gas barrier properties to saponified ethylene-vinyl ester copolymers, while polyvinyl alcohol and liquid crystal polymers have inferior stretchability to saponified ethylene-vinyl ester copolymers. Thus, those polymers having gas barrier properties do not have good balance of gas barrier properties and stretchability.

SUMMARY OF THE INVENTION

One object of the present invention is to provide a material having gas barrier properties which are comparable with those of saponified ethylene-vinyl ester copolymers, and better stretchability than saponified ethylene-vinyl ester copolymers.

According to one aspect of the present invention, there is provided a resin material comprising a resin, which satisfies at least one relationship selected from the group consisting of the following relationships [I] and [II]:

$$\ln(OTR/22.5)+4.78\ \ln(Fy/Fy')<-0.13,\ \text{and}\ T_2-T_1<20 \qquad [I]$$

in which

Fy' is a yield strength of a standard saponified ethylene-vinyl acetate copolymer at 60° C.;

Fy is a yield strength of said resin material at 60° C.; OTR is an oxygen gas permeability (cc/m$^2$·day·atm) of said resin material per a unit thickness of 1 μm at 23° C. and a relative humidity of 0%;

$T_1$ is a haze (%) of a film of said resin material having a thickness of 30 μm after being maintained at 23° C. and a relative humidity of 48% for 48 hours; and $T_2$ is a haze (%) of a film of said resin material having a thickness of 30 μm after being maintained at 40° C. and a relative humidity of 90% for 24 hour, and $$\ln(OTR/22.5)+0.0698(T_{im}-157)<-0.06 \qquad [II]$$

in which

OTR is an oxygen gas permeability (cc/m$^2$·day·atm) of said resin material per a unit thickness of 1 μm at 23° C. and a relative humidity of 0%; and $T_{im}$ is a melting point of said resin material.

This and other embodiments of the present invention will be explained in detail.

PREFERABLE EMBODIMENTS OF THE INVENTION

One embodiment of the resin material according to the present invention comprises a resin as a main component, and satisfies the following inequalities (1) and (2):

$$\ln(OTR/22.5)+4.78\ \ln(Fy/Fy')<-0.13 \qquad (1)$$

and $$T_2-T_1\leq 20 \qquad (2)$$

In the inequality (1), ln(OTR/22.5) is the natural logarithm of (OTR/22.5), and ln(Fy/Fy') is the natural logarithm of (Fy/Fy').

OTR is an oxygen gas permeability (cc/m$^2$·day·atm) of the resin material of the present invention per a unit thickness of 1 μm at 23° C. and a relative humidity of 0%. OTR is preferably less than 22.5, more preferably 18 or less, in particular 11 or less.

Fy is a yield strength of the resin material of the present invention at 60° C., and expressed by the yield strength of a test specimen (No. 1 dumbbell defined by JIS K 6301) at 60° C., which is cut out from a pressed sheet having a thickness of 300 μm obtained by heat pressing the resin material of the present invention at 200° C. for 3 minutes and cold pressing it at 30° C. for 5 minutes. A yield strength is read from a tensile stress-strain curve (namely S—S curve), which is drawn based on the results of a tensile test carried out using a tensile tester in which the temperature of a test specimen can be controlled (for example, AGS 500D manufactured by Shimadzu Corporation) at a specimen temperature of 60° C. at a pulling rate of 1,000 mm/min.

Fy' is a yield strength of a standard saponified ethylene-vinyl acetate copolymer at 60° C., and can be obtained in the same way as Fy except that the standard saponified ethylene-vinyl acetate copolymer is used in place of the resin material of the present invention.

When the inequality (1) is not satisfied, the oxygen gas permeability of the resin material is too high, that is, the gas barrier properties are insufficient, the stretchability of the resin material at a low temperature is low, and thus, a high stretching temperature is required to sufficiently stretch the resin material. When the inequality (1) is satisfied, but the inequality (2) is not satisfied, the stretchability and/or gas barrier properties of the resin material are not satisfactory. To achieve both good gas barrier properties and stretchability, $\ln(OTR/22.5)+4.78\ln(Fy/Fy')$ is preferably less than $-0.4$, more preferably less than $-0.7$.

Herein, a "standard saponified ethylene-vinyl acetate copolymer" means a saponified ethylene-vinyl acetate copolymer having an ethylene unit content of 44%, a saponification value of at least 98%, a melt index (MI) of 5.5 g/10 min., which is measured at 190° C. under a load of 2.16 kg after preheating a sample at 190° C. for 6 minutes, an oxygen gas permeability of 22.5 cc/m$^2$·day·atm per a unit thickness of 1 μm at 23° C. and a relative humidity of 0%, and a melting point of 157° C.

An ethylene unit content is a ratio of the number of ethylene units to the number of whole polymerized monomer units of a saponified ethylene-vinyl acetate copolymer. The content of ethylene units and the saponification value can be measured by an infrared absorption method.

A standard saponified ethylene-vinyl acetate copolymer may be obtained by copolymerizing ethylene and vinyl acetate and saponifying the copolymer so that the copolymer satisfies the above ethylene unit content, saponification degree and MI. One example of a commercially available standard saponified ethylene-vinyl acetate copolymer is EP-E105B which is produced by KURARAY CO., LTD. Saponified ethylene-vinyl acetate copolymers, which are substantially the same as EP-E105B may be used as standard saponified ethylene-vinyl acetate copolymers.

In the above inequality (2), $T_1$ is a haze of a film of the resin material of the present invention having a thickness of 30 μm after being maintained at 23° C. and a relative humidity of 48% for 48 hours, and $T_2$ is a haze of a film of the resin material of the present invention having a thickness of 30 μm after being maintained at 40° C. and a relative humidity of 90% for 24 hour. A film used to measure a haze is prepared by heat pressing a resin material at 200° C. for 3 minutes and then cool pressing at 30° C. for 5 minutes.

A haze is defined by the formula:

$$(\text{Transmittance of scattered light})/\text{Total light transmittance}) \times 100 \, (\%)$$

and measured according to JIS K 7105. A smaller haze means better transparency of a resin material. $T_1$ is preferably 4.9% or less, more preferably 4% or less, from the viewpoint of the transparency of a resin material.

The composition of the resin material according to the present invention is not limited insofar as it contains a resin as a main component, and satisfies the above inequalities (1) and (2).

In one preferred embodiment, the resin material of the present invention consists essentially of a resin as a main component, and contains substantially no component other than the resin. In this embodiment, a resin may be a single resin, or a mixture of two or more resins.

In another preferred embodiment, the resin material of the present invention is a composition comprising a resin as a main component and a component or components other than the resin. This composition will be referred to as a composite embodiment. Also in this embodiment, a resin as a main component may be a single resin or a mixture of two or more resins.

In the composite embodiment, a component other than the above resin, which is used so that the composition satisfies the above inequalities (1) and (2), is referred to as "third component". The composite embodiment is preferred from the viewpoint of the easy control of properties such as gas barrier properties and stretchability of the resin material.

The resin material of the present invention may contain additives which are conventionally compounded in resins, such as fillers, antistatic agents, stabilizers, nucleating agents, colorants, lubricants, rubbers, etc.

A resin used as the main component of the resin material of the present invention is not limited. Examples of resins include saponified polyvinyl esters (e.g. polyvinyl alcohol, etc.), saponified ethylene-vinyl ester copolymers (e.g. ethylene-vinyl alcohol, etc.), polyolefin resins (e.g. low density or high density polyethylene, ethylene-propylene copolymer, ethylene-butene copolymer, ethylene-hexene copolymer, ethylene-octene copolymer, polypropylene, etc.), ethylene-vinyl ester copolymers (e.g. ethylene-vinyl acetate copolymers, etc.), ethylene-(meth)acrylate copolymers (e.g. ethylene-methyl methacrylate copolymer, ethylene-methyl acrylate copolymer, etc.), ionomer resins, polyester resins (e.g. polyethylene terephthalate, polybutylene terephthalate, polyethylene naphthalate, polyhydroxybenzoic acid, etc.), polyamide resins (e.g. Nylon-6, Nylon-6,6, metaxylenediamine-adipic acid condensation polymer and its salts, etc.), aramid resins, acrylic resins (e.g. polymethyl methacrylate, polyacrylic acid, polysodium acrylate, poly-2-hydroxyethyl acrylate, poly-2-hydroxyethyl methacrylate, polyacrylamide, ethylene-acrylic acid copolymer and its salts, etc.), styrene or acrylonitrile resins (e.g. polystyrene, styrene-acrylonitrile copolymer, styrene-acrylonitrile-butadiene copolymer, polyacrylonitrile, etc.), halogen-containing resins (e.g. polyvinyl chloride, polyvinylidene chloride, polyvinylidene fluoride, polytetrafluoroethylene, etc.), engineering plastics (e.g. polycarbonate resin, polysulfone resin, polyethersulfone resin, polyetheretherketone resin, polyphenylene oxide resin, polymethylene oxide, etc.), and the like. Furthermore, modified resins may be used, which are prepared by graft-modifying or crosslinking the above resins, or by modifying the molecular chain ends of the above resins.

Preferred examples of the resin material of the present invention are a resin material consisting of a modified saponified ethylene-vinyl ester copolymer which is obtained by graft-modifying, crosslinking or chain-end-modifying a saponified ethylene-vinyl ester copolymer, and a composition comprising a saponified ethylene-vinyl ester copolymer and the third component. The latter composition is particularly preferred. The vinyl ester units of the saponified ethylene-vinyl ester copolymer are preferably vinyl acetate units.

The content of ethylene units in a saponified ethylene-vinyl ester copolymer which is preferably used in the present invention is preferably from about 20% to about 60%, more preferably from about 20% to about 45%, in particular from about 25% to about 40%, based on the total number of polymerized monomer units, from the viewpoint of the moisture resistance of the resin material.

The saponification value of the vinyl ester components is usually at least about 90%, preferably at least about 95%, more preferably at least about 98%.

When the resin material of the present invention is a composition comprising a saponified ethylene-vinyl ester copolymer and the third component, the content of the saponified ethylene-vinyl ester copolymer is preferably from 99 to 50 wt. % of the whole composition from the viewpoint of the gas barrier properties, processability and stretchability of the resin material.

One preferred example of the third component, which is used in combination with a saponified ethylene-vinyl ester copolymer, is an alcohol having a 1,3-diol structure of the following formula (3) having a solubility parameter (SP) and a molecular weight (MW) which satisfy the following inequalities (4) and (5), from the viewpoint of a compatibility with the saponified ethylene-vinyl ester copolymer:

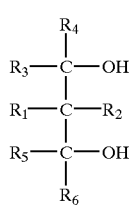

(3)

$$SP \geq 12 \quad (4)$$

$$SP \times MW^{1/2} \geq 225 \quad (5)$$

In the formula (3), $R_1$ to $R_6$ are the same or different and represent a hydrogen atom, or an atomic group composed of at least two atoms selected from the group consisting of hydrogen, carbon, nitrogen, oxygen, phosphorus and sulfur atoms, provided that the total atomic weight of atoms constituting $R_2$ is more than that of atoms constituting $R_1$.

A solubility parameter (SP) is described in POLYMER ENGINEERING AND SCIENCE, Vol. 14, No. 2 (1974) 147–154, the disclosure of which is hereby incorporated by reference, and defined by the following equation (6):

$$SP = (\Delta Ev/V)^{1/2} \quad (6)$$

wherein $\Delta Ev$ is a molar cohesive energy (cal/mol), which is defined by the equation (7):

$$\Delta Ev = \Sigma e_i \quad (7)$$

and V is a molar volume defined by the equation (8):

$$V = \Sigma \Delta v_i \quad (8)$$

wherein $e_i$ and $v_i$ are the values listed in Table 5 of the above-described literature.

One preferable resin material of the present invention can contain at least one of the above-defined alcohols. When a resin material contains two or more alcohols, SP is an averaged solubility parameter defined by the following equation (9), and MW is a weight average molecular weight defined by the following equation (10):

$$SP = (\Sigma \alpha_i \Delta Ev_i / \Sigma \alpha_i V_i)^{1/2} \quad (9)$$

wherein $\Delta Ev_i$ and $V_i$ are a molar cohesive energy (cal/mol) and a molar volume (cm$^3$/mol) of each alcohol, respectively, and $\alpha_i$ is a molar fraction of each alcohol in the whole alcohols, $$MW = \Sigma \phi_i mw_i \quad (10)$$

wherein $\phi_i$ and $mw_i$ are a weight fraction of each alcohol in the whole alcohols, and a molecular weight of each alcohol, respectively.

When the resin material of the present invention contains the above alcohol(s), SP of the alcohol(s) is preferably at least about 13 from the viewpoint of the compatibility of the alcohol(s) with the resin. The upper limit of SP is about 20. $SP \times MW^{1/2}$ is preferably at least about 235, from the viewpoint of the suppression of bleeding of the alcohol (s). The upper limit of $SP \times MW^{1/2}$ is about 20,000.

In the formula (3), $R_1$ to $R_6$ represent a hydrogen atom, or an atomic group composed of at least two atoms selected from the group consisting of hydrogen, carbon, nitrogen, oxygen, phosphorus and sulfur atoms. The total atomic weight of atoms constituting $R_2$ is more than that of atoms constituting $R_1$, $R_1$ to $R_6$ may the same or different. $R_1$ to $R_6$ are selected so that SP and MW satisfy tie above equations (4) and (5). Typical examples of the atomic groups include atomic groups such as alkyl groups, cycloalkyl groups, atomatic hydrocarbons, heterocyclic groups, etc.; functional groups such as a hydroxyl group, a nitroso group, a sulfinyl group, a sulfonyl group, a phosphino group, a phosphonyl group, etc.; and atomic groups having at least one functional group.

Preferably, $R_1$ is a hydrogen atom, or a hydroxyalkyl group, an alkyl groups, an amino group or an atomic group having an amino group. In particular, $R_1$ is a methylol group; a methyl group, an ethyl group or an amino group.

Preferably, $R_2$ is an atomic group having a hydroxyl group and a total atomic weight of the constituting atoms of at least 31.

Preferably, $R_3$ to $R_6$ are each a hydrogen atom or a low alkyl group. A preferred lower alkyl group is an alkyl group having 1 to 6 carbon atoms, in particular, a methyl group or an ethyl group.

Examples of the alcohol used in the present invention include polypentaerithritols (e.g. dipentaerithritol, tripentaerithritol, etc.), polytrimethylolmethanes (e.g. ditrimethylolmethane, tritrimethylolmethane, etc.), polytrimethylolethanes (e.g. ditrimethylolethane, tritrimethylolethane, etc.), polytrimethylolpropanes (e.g. ditrimethylolpropane, tritrimethylolpropane, tetratrimethylolpropane, pentatrimethylolpropane, etc.), poly-2-amino-2-hydroxymethyl-1,3-propanediols (e.g. di-2-amino-2-hydroxymethyl-1,3-propanediol, tri-2-amino-2-hydroxymethyl-1,3-propanediol, etc.), and the like.

The third component may be an ester of an alcohol and a carboxylic acid (e.g. a monocarboxylic acid, a dicarboxylic acid or a tricarboxylic acid) having a 1,3-diol structure.

Examples of monocarboxylic acids include aliphatic monocarboxylic acids (e.g. acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linoleic acid, arachidic acid, behenic acid, etc.), alicyclic monocarboxylic acids (e.g. cyclohexanecarboxylic acid, methylcyclohexnanecarboxylic acid, etc.), aromatic monocarboxylic acids (e.g. benzoic acid, toluic acid, ethylbenzoic acid, phenylacetic acid, etc.).

Examples of dicarboxylic acids include aliphatic dicarboxylic acids (e.g. malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, octadecenedioic acid, eicosanedioic acid, eicosenedioic acid, docosanedioic acid, 2,2,4-trimethyladipicacid, etc.), alicyclicdicarboxylic acids (e.g. 1,4-cyclohexanedicarboxylic acid, etc.), aromatic dicarboxylic acids (e.g. terephthalic acid, isophthalic acid, phthalic acid, xylynedicarboxylic acid, etc.), and the like.

Examples of tricarboxylic acids include 1,2,3-propanetricarboxylic acid, aconitic acid, and the like.

Preferred examples of alchols include polytrimethylolpropane anddipentaerithritol. In particular, a dimer, a trimer, a tetramer or a pentamer of trimethylolpropane are preferred.

When the resin material of the present invention is a composition comprising a saponified ethylene-vinyl ester copolymer and two or more alcohols, the composition preferably contains at least one alcohol having a solubility parameter sp, and a molecular weight $mw_i$, which satisfy the following inequalities:

$$sp_i \geq 16, \text{ and } sp_i \times mw_i^{1/2} \geq 280$$

Such an alcohol will be referred to as "specific alcohol". The composition preferably contains at least 20 wt. % of a specific alcohol based on the whole alcohols. Preferably, the amount of the specific alcohol does not exceed 70 wt. % of the whole alcohols to avoid the bleeding of the alcohol (s) from the surface of the composition. The specific alcohol is preferably polypentaerithritol, in particular, dipentaerithritol.

The resin material of the present invention may contain, as a main component, a modified resin prepared by the reaction of a resin and the third component (for example, a modified product of a saponified ethylene-vinyl ester copolymer, which is obtained by the reaction of the saponified ethylene-vinyl ester copolymer and an alcohol), or a copolymer obtained by the copolymerization of a copolymerizable third component and a copolymerizable monomer.

A modified resin can be prepared by a conventional graft-modification method, for example, a method comprising forming a polymerization-initiating site on a backbone polymer and polymerizing the third component monomer, or the reaction of a resin and the polymerizable third component. The graft reaction maybe carried out in a homogeneous system (for example, a reaction in a solution), or a heterogeneous system (for example, a solid-liquid reaction). A modified resin may be prepared by the conventional crosslinking of a backbone polymer using a crosslinking agent or heat. Furthermore, a modified resin may be prepared by the conventional modification of chain ends of a backbone polymer by introducing a functional atomic group into the backbone polymer when the polymerization reaction of the backbone polymer is terminated. The preparation of such a modified resin may be carried out with an extruder.

When the resin material of the present invention is a composition comprising at least one resin, it may be prepared by a melt-kneading extrusion method using a conventional single- or twin-screw extruder which is commonly used to knead resins. When a viscous fluid third component is used in the course of the preparation of the resin material, the third component is dissolved in a solvent (e.g. water or organic solvents) and then supplied to the kneading step. In this case, the resin material of the present invention may be prepared by a method comprising the steps of pouring the solution of the third component into the midsection of the cylinder of an extruder while kneading a resin in the cylinder, and then further kneading the resin and the third component in the downstream zone of the cylinder, or a method comprising the steps of blending resin pellets and the solution of the third component with a mixer such as a Henschel mixer, and then supplying the mixture in an extruder to knead the mixture. Alternatively, the resin material of the present invention may be prepared by blending the pellets of a master batch containing the third component in a high concentration with resin pellets, and then melting and kneading the mixture with an extruder.

When the third component is a powder, the resin material of the present invention can be prepared by a method comprising the steps of dry blending resin pellets and the third component and supplying the mixture in an extruder to melt and knead the mixture, or a method comprising supplying the third component powder and resin pellets directly in an extruder to melt and knead them.

Apart from a resin material which satisfies the above inequalities (1) and (2), a resin material, which satisfies the following inequality (11), has good gas barrier properties and stretchability at a low temperature:

$$\ln(OTR/22.5)+0.0698(T_{im}-157)<-0.06 \quad (11)$$

wherein OTR is an oxygen gas permeability (cc/m²·day·atm) of the resin material per a unit thickness of 1 μm at 23° C. and a relative humidity of 0%, and $T_{im}$ is a melting point of the resin material.

Amelting point $T_{im}$ is measured with a differential scanning calorimeter according to JIS K 7121. Prior to the measurement of a melting point, a sample is maintained in the calorimeter at a temperature of 23° C. and a relative humidity of 50% for 24 hours or more, and then subjected to a pretreatment. In the pretreatment, the sample is heated in the calorimeter to a temperature 30° C. higher than a temperature at which the sample shows a melting peak (hereinafter referred to as "maximum temperature"), maintained at the maximum temperature for 10 minutes, and cooled to a temperature 50° C. lower than a temperature at which the sample shows a transition peak at a cooling rate of 10°/min. After this pretreatment, a melting point is measured. In the measurement of a melting point, the pretreated sample is heated at a heating rate of 10° C./min. until at least one melting peak is observed. A melting point ($T_{im}$) is defined as a temperature corresponding to a point of intersection between a line which is extended in the direction on the higher temperature side from a base line on the lower temperature side of the melting peak, and a tangent line having the steepest slope on the curve of the melting peak on the lower temperature side.

The value of $\ln(OTR/22.5)+0.0698$ ($T_{im}-157$) is preferably less than −0.1, in particular, less than −0.4, to achieve both good gas barrier properties and stretchability.

The resin material of the present invention can be processed to produce various products. In particular, the resin material can be used as a material of a gas barrier film because of good gas barrier properties and stretchability.

In one embodiment of a gas barrier film, the film is a single layer film of the resin material of the present invention. In a further embodiment of a gas barrier film, the film is a multi-layer film comprising at least one layer of the resin material of the present invention, and at least one layer of other material than the resin material of the present invention. The layer of the other material may be made of resins, metals, paper, fabrics, etc. The layer structure of the multi-layer film is not limited. One typical example of the multi-layer film is a film comprising a layer of a substrate resin, a layer of a thermal bonding resin, and a layer of the resin material of the present invention interposed between them. Such a multi-layer film may have one or more additional layers depending on desired film properties.

The thickness of a film is usually from about 10 μm to about 500 μm. The thickness of a film suitable for packaging is usually from about 15 μm to about 100 μm. In the case of a multi-layer film, the thickness of the layer of the resin material according to the present invention is preferably from about 5% to about 30% of the total thickness of the multi-layer film, from the viewpoint of a balance between effects and costs.

When a multi-layer film has a substrate resin layer formed from a material other than the resin material of the present invention, the substrate resin layer may be formed from a polyolefin resin (e.g. low density polyethylene, high density polyethylene, ethylene-propylene copolymer, ethylene-butene copolymer, ethylene-hexene copolymer, etylene-octene copolymer, polypropyrene, etc.), an ethylene-vinyl ester copolymer (e.g. ethylene vinyl acetate, etc.), an ethylene-(meth)acrylate copolymer (e.g. ethylene-methyl methacrylate copolymer, etc.) an ionomer resin, a polyester resin (e.g. polyethylene terephthalate, polybutyrene terephthalate, polyethylene naphthalate, etc.), a polyamide resin (e.g. Nylon-6, Nylon-6,6, metaxylenediamine-adipic acid condensation polymer, polymethylmetacrylimide, etc.), an acrylic resin (e.g. polymethyl methacrylate, etc.), a styrene or acrylonitrile resin (e.g. polystyrene, styrene-acrylonitrile copolymer, styrene-acrylonitrile-butadiene copolymer, polyacrylonitrile, etc.), a hydrophobic cellulose resin (e.g. cellulose triacetate, cellulose diacetate, etc.), a halogen-containing resin (e.g. polyvinyl chloride, polyvinylidene chloride, polyvinylidene fluoride, polytetrafluoroethylene, etc.), a hydrogen-bonding resin (e.g. polyvinyl alcohol, ethylene-vinyl alcohol copolymer, cellulose derivative, etc.), an engineering plastic (e.g. polycarbonate resin, polysulfone resin, polyethersulfone resin, polyetheretherketone resin, polyphenylene oxide resin, polymethylene oxide, liquid crystal polyester resin, etc.), and the like. Among them, polyolefin resins, in particular, polyethylene and polypropylene are preferable from the viewpoint of strength.

Examples of resins for a thermal bonding layer include polyolefin resins (e.g. low density polyethylene, high density polyethylene, ethylene-propylene copolymer, ethylene-butene copolymer, ethylene-hexene copolymer, ethylene-4-methyl-1-pentene copolymer, etylene-octene copolymer, polypropyrene, etc.), ethylene-vinyl ester copolymers (e.g. ethylene vinyl acetate, etc.), ethylene-(meth)acrylate copolymers (e.g. ethylene-methyl methacrylate copolymer, ethylene-methyl acrylate copolymer, etc.), ethylene-vinylcarboxylic acid copolymers (e.g. ethylene-acrylic acid copolymer, etc.), ionomer resins, saponified ethylene-vinyl ester copolymers (e.g. ethylene-vinyl alcohol copolymer, etc.), polyamide resins (e.g. Nylon-6, Nylon-6, 6, etc.), styreneor acrylonitrile resins (e.g. polystyrene, styrene-acrylonitrile copolymer, styrene-acrylonitrile-butadiene copolymer, polyacrylonitrile, etc.), polyacrylates (e.g. polymethyl methacrylate, etc.), and the like.

The layer of an adhesive resin may preferably be formed to produce a multi-layer film having a good interlaminar bond strength. An adhesive resin is not limited, and may be a modified polyolefin polymer having a carboxyl group, which is prepared by chemically bonding an unsaturated carboxylic acid or its anhydride to an olefin polymer. Preferred examples of such a modified olefin polymer include polyethylene graft modified with maleic anhydride, polypropylene graft modified with maleic anhydride, ethylene-ethyl acrylate copolymer modified with maleic anhydride, ethylene-vinyl acetate modified with maleic anhydride, ethylene-acrylic acid copolymer modified with maleic anhydride, and ionomer resin modified with maleic anhydride.

A single-layer film may be produced by any conventional molding method such as extrusion. A multi-layer film may be produced by co-extrusion, melt coating, extrusion lamination, dry lamination, and the like.

A film may be an unstretched film or a stretched film, and either film can be used for packaging. In particular, a stretched film having heat shrinking properties is preferably used for shrink packaging.

As a method for the production of a stretched film, conventional stretching methods such as uniaxial stretching, zone stretching, flat sequential stretching, simultaneous biaxial stretching, tubular stretching and the like are exemplified. Among them, tubular stretching is preferably employed from the viewpoint of plant investment.

Besides films, the resin material of the present invention can be shaped in various products such as sheets, tubes, cups, bottles, etc. To produce such products, any conventional molding methods, for example, hot molding (e.g. vacuum molding, drawing, air-pressure forming, etc.), injection molding, blow molding, stretch-blow molding, and the like, may be employed.

The produced molded articles are suitable as containers for packaging general foodstuffs, retort foodstuffs, medicines, electronic parts, gasoline, etc. A multi-layer film comprising a layer of the resin material of the present invention and a layer of a thermal bonding resin is particularlyuseful as a heat-shrinkable film.

The resin material of the present invention has gas barrier properties comparable to or better than those of conventional ethylene-vinyl ester copolymers, and better stretchability than that of the conventional ethylene-vinyl ester copolymers. Furthermore, the resin material of the present invention has good transparency, and suffers less deterioration of transparency over time.

EXAMPLES

The present invention will be illustrated by the following examples, which do not limit the scope of the invention in any way.

Various properties are measured as follows:

[Oxygen Gas Permeability]

The oxygen gas permeability of a resin material was measured according to JIS K 7126.

A resin material was heat pressed at 200° C. for 3 minutes and then cold pressed at 30° C. for 5 minutes to prepare a test sheet. Then, the oxygen gas permeability of the test sheet was measured with an oxygen-permeability measuring instrument (OX-TRAN 10/50A manufactured by MOCON, USA).

The oxygen gas permeability of the test sheet was continuously measured, and the gas permeability value, which was obtained when the gas permeability became substantially constant, was used as the oxygen gas permeability of the test sheet.

In the above testing, it took several hours to about 3 days from the start of the measurement to the substantial stabilization of the oxygen gas permeability. The measurement was carried out at 23° C. and a relative humidity of 0%. Then, the oxygen gas permeability per a unit thickness of 1 $\mu$m was calculated from the measured oxygen permeability value, and used as "OTR". The unit of OTR is "cc/m$^2$·day·atm".

[Yield Strength and Elongation at Break]

The yield strength of a resin material was measured at 60° C. by the following method according to JIS K 7113

A resin material was heat pressed at 200° C. for 3 minutes and then cold pressed at 30° C. for 5 minutes to prepare a film having a thickness of 300 $\mu$m. Then, a test specimen in the form of No. 1 dumbbell defined by JIS K 6301 was cut out from the film.

Using a tensile tester (AGS 500D manufactured by Shimadzu Corporation) in which the temperature of a test specimen can be controlled, the test specimen was pulled at a specimen temperature of 60° C. at a pulling rate of 1,000 mm/min. until the specimen was broken. Then, a yield strength Fy (kg/cm$^2$) at 60° C. was read from a tensile stress-strain curve (S—S curve)

In the above measurement of tensile strength, a distance between gage marks marked on the test specimen was measured before and after the measurement, and an elongation at break l (%) was calculated according to the following formula:

$$l=[(L-L_0)/L_0] \times 100$$

wherein $L_0$ is a distance between gage marks on the specimen before measurement, and L is a distance between gage marks at break.

The larger l (elongation at break) means a larger stretching ratio at 60° C., and thus a resin material has better stretchability.

Separately, a yield strength was measured with a test specimen, which had been prepared by the same method as above from a standard saponified ethylene-vinyl acetate copolymer having an ethylene unit content of 44%, a saponification value exceeding 98%, a melt index MI of 5.5 g/10 min., an oxygen gas permeability of 22.5 cc/m$^2$·day·atm per a thickness of 1 μm at 23° C. and a relative humidity of 0%, and a melting point of 157° C. (EP-E105B manufactured by KURARAY Co., Ltd., hereinafter referred to as "EVOH-E"). The yield strength Fy' was 296 kg/cm$^2$.

[$T_1$]

A resin material was heat pressed at 200° C. for 3 minutes and then cold pressed at 30° C. for 5 minutes to prepare a film having a thickness of 30 μm. This film was maintained at 23° C. and a relative humidity of 48% for 48 hours, and then its haze $T_1$ was measured according to JIS K 7105. The measurement of a haze was carried out using a direct-reading haze computer (HGM-DP manufactured by SUGA SHIKENKI KABUSHIKIKAISHA).

[$T_2$]

A film having a thickness of 30 μm, which had been prepared in the same manner as above, was maintained at 40° C. and a relative humidity of 90% for 24 hours, and then its haze $T_2$ was measured.

[Evaluation of Stretchability]

A resin material having substantially the same (±2%) elongation at break as that of the standard saponified ethylene-vinyl acetate copolymer was ranked "B", one having larger elongation at break than the above was ranked "A", and one having less elongation at break than the above was ranked "C".

[Evaluation of Gas Barrier Properties]

A resin material having substantially the same (±10%) oxygen gas permeability as that of the standard saponified ethylene-vinyl acetate copolymer was ranked "B", one having less oxygen gas permeability than the above was ranked "A", and one having larger oxygen gas permeability than the above was ranked "C".

[Total Evaluation]

In relative comparisons, a resin material having an excellent balance of the evaluation of stretchability and the evaluation of gas barrier properties was ranked "A", one having a good balance was ranked "B", and one having a low balance was ranked "C".

Example 1

Dipentaerithritol (DIPENTALID manufactured by KOEI Chemical Co., Ltd., hereinafter referred to as "DP") and ditrimethyloipropane (manufactured by KOEI Chemical Co., Ltd., hereinafter referred to as "DTMP") were mixed in a weight ratio of 1:1. DP had sp$_i$ of 18.7, mw$_i$ of 272, and (sp$_i$×mw$_i^{1/2}$) of 308, and DTMP had sp$_i$ of 14.4, mw$_i$ of 250, and (sp$_i$×mw$_i^{1/2}$) of 228. Thus, the mixture had an average solubility parameter SP of 16.4, a weight average molecular weight MW of 261, and (Sp×MW$^{1/2}$) of 265.

The above mixture and the standard saponified ethylene-vinyl acetate copolymer (EVOH-E) were dry blended in a weight ratio of 10:90, and the obtained mixture was melted and kneaded with a twin-screw extruder (40 mmφ extruder BT-40-S2-60-L manufactured by KABUSHIKIKAISHA PLASTIC KOGAKU KENKYUUSHO; L/D=60) to obtain the composition. The results of the evaluations of the composition are shown in Table 1.

Example 2

A composition was prepared in the same manner as in Example 1 except that a saponified ethylene-vinyl acetate copolymer having an ethylene unit content of 38% and a saponfication value exceeding 98% (ES-H101B manufactured by KURARAY CO., LTD., hereinafter referred to as "EVOH-H") in place of EVOH-E. The results of the evaluations of the composition are shown in Table 1.

Example 3

A composition was prepared in the same manner as in Example 1 except that a saponified ethylene-vinyl acetate copolymer having an ethylene unit content of 32% and a saponfication value exceeding 98% (EP-F101A manufactured by KURARAY CO., LTD., hereinafter referred to as "EVOH-F") in place of EVOH-E. The results of the evaluations of the composition are shown in Table 1.

Example 4

A composition was prepared in the same manner as in Example 1 except that DTMP and EVOH-E were dry blended in a weight ratio of 10:90. The results of the evaluations of the composition are shown in Table 1.

Example 5

A composition was prepared in the same manner as in Example 2 except that DTMP and EVOH-H were dry blended in a weight ratio of 10:90. The results of the evaluations of the composition are shown in Table 1.

Example 6

A composition was prepared in the same manner as in Example 3 except that DTMP and EVOH-F were dry blended in a weight ratio of 10:90. The results of the evaluations of the composition are shown in Table 1.

Comparative Example 1

The results of the evaluations of the standard saponified ethylene-vinyl acetate copolymer (EVOH-E) are shown in Table 1.

Comparative Example 2

The results of the evaluations of EVOH-H are shown in Table 1.

Comparative Example 3

The results of the evaluations of EVOH-F are shown in Table 1.

Comparative Example 4

A composition was prepared in the same manner as in Example 3 except that diglycerin and EVOH-E were dry blended in a weight ratio of 10:90. The results of the evaluations of the composition are shown in Table 1.

TABLE 1

|  | Ex. 1 | Ex. 2 | Ex. 3 | Ex. 4 | Ex. 5 | Ex. 6 | C.E. 1 | C.E. 2 | C.E. 3 | C.E. 4 |
|---|---|---|---|---|---|---|---|---|---|---|
| Gas barrier material | | | | | | | | | | |
| Resin | EVOH-E | EVOH-H | EVOH-F | EVOH-E | EVOH-H | EVOH-F | EVOH-E | EVOH-H | EVOH-F | EVOH-E |
| Ethylene content (mol %) | 44 | 38 | 32 | 44 | 38 | 32 | 44 | 38 | 32 | 44 |
| Amount (wt. %) | 90 | 90 | 90 | 90 | 90 | 90 | 100 | 100 | 100 | 90 |
| Compound | DTMP | DTMP | DTMP | DTMP | DTMP | DTMP | — | — | — | Diglycerin |
| Amount (wt. %) | 5 | 5 | 5 | 10 | 10 | 10 | — | — | — | 10 |
| Compound | DP | DP | DP | DP | DP | DP | — | — | — | — |
| Amount (wt. %) | 5 | 5 | 5 | 0 | 0 | 0 | 0 | 0 | 0 | 0 |
| SP | 16.4 | 16.4 | 16.4 | 14.4 | 14.4 | 14.4 | — | — | — | 18.3 |
| MW | 261 | 261 | 261 | 250 | 250 | 250 | — | — | — | 166 |
| $SP \times MW^{1/2}$ | 265 | 265 | 265 | 228 | 228 | 228 | — | — | — | 236 |
| Physical Properties | | | | | | | | | | |
| Fy (yield strength) (kg/cm²) | 269 | 291 | 277 | 216 | 228 | 290 | 296 | 336 | 388 | 170 |
| OTR | 16.5 | 7.9 | 4.3 | 17.1 | 7.2 | 7.2 | 22.4 | 10.8 | 5.9 | 124.5 |
| $C^{1)}$ | −0.77 | −1.13 | −1.97 | −1.78 | −2.39 | −1.24 | 0.00 | −0.13 | −0.05 | −0.94 |
| $T_1$ | 2.6 | 3.7 | 4.0 | 4.0 | 4.0 | 4.2 | 5.0 | 5.7 | 6.1 | 11.3 |
| $T_2$ | 0 | 0 | 0 | 20 | 19 | 16 | 0 | 0 | 0 | 75 |
| $T_2-T_1$ | −2.6 | −3.7 | −4 | 16 | 15 | 12 | −5 | −5.7 | −6.1 | 63.7 |
| Transparency | A | A | A | A | A | A | B | B | B | C |
| Elongation at break (%) | 665 | 623 | 638 | 685 | 714 | 601 | 605 | 476 | 433 | 600 |
| Stretchability | A | A | A | A | A | B | B | C | C | B |
| Stretchability/gas barrier property | A/A | A/A | A/A | A/A | A/A | B/A | B/B | C/A | C/A | B/C |
| Total evaluation | A | A | A | A | A | A-B | B | B-C | B-C | C |

Note:
$^{1)}C = \ln(OTR/22.5) + 4.78\ln(Fy/Fy')$.

What is claimed is:

1. A resin material comprising (a) a resin comprised of a saponified ethylene-vinyl ester copolymer and (b) at least one alcohol having a 1,3-diol backbone represented by the formula:

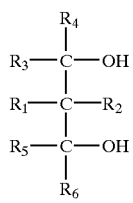

(3)

wherein $R_1$ represents a group selected from the group consisting of a hydrogen atom, a hydroxyalkyl group, an alkyl group, an amino group and an atomic group having an amino group; $R_2$ represents an atomic group having both a hydroxyl group and a total atomic weight of its constituent atoms of at least 31; $R_3$ to $R_6$ represent a hydrogen atom or a lower alkyl group, said atomic groups being composed of at least two atoms selected from the group consisting of hydrogen, carbon, nitrogen, oxygen, phosphorus and sulfur atoms, and said alcohol having a solubility parameter (SP) in $(cal/cm^3)^{1/2}$ and a molecular weight (MW) which satisfy the following inequalities:

$$SP \geq 12$$

$$SP \times MW \geq 235,$$

with the proviso that when there are at least two alcohols, SP and MW are an averaged solubility parameter and a weight average molecular weight respectively, and wherein said mater satisfies at least one relationship selected from the group consisting of the following relationships (I) and (II)

$$\ln(OTR/22.5)+4.78\ln(Fy/Fy') < -0.13, \text{ and } T_2-T_1 \leq 20 \quad (I)$$

in which
Fy' is a yield strength of a standard saponified ethylene-vinyl acetate copolymer at 60° C.;
Fy is a yield strength of said resin material at 60-C;
OTR is an oxygen gas permeability (cc/m²·day·atm) of said resin material per a unit thickness of 1 μm at 23° C. and a relative humidity of 0%;
$T_1$ is a haze (%) of a film of said resin material having a thickness of 30 μm after being maintained at 23° C. and a relative humidity of 48% for 48 hours; and
$T_2$ is a haze (%) of a film of said resin material having a thickness of 30 μm after being maintained at 40° C. and a relative humidity of 90% for 24 hour; and $$\ln(OTR/22.5)+0.0698(T_{im}-157) < -0.06 \quad (II)$$

in which
OTR is an oxygen gas permeability (cc/m²·day·atm) of said resin material per a unit thickness of 1 μm at 23° C. and a relative humidity of 0%; and
$T_{im}$ is a melting point of said resin material.

2. The resin material according to claim 1, which satisfies the following inequality:

$$\ln(OTR/22.5)+4.78\ln(Fy/Fy') < -0.4.$$

3. The resin material according to claim 1, which satisfies the following inequality:

$$\ln(OTR/22.5)+4.78\ln(Fy/Fy') < -0.7.$$

4. The resin material according to claim 1, wherein $T_1$ is 4.9% or less.

5. The resin material according to claim 1, wherein said saponified ethylene-vinyl ester copolymer comprises about 99% to about 50% of the whole resin material.

6. The resin material according to claim 1, wherein the SP is at least 13.

7. The resin material according to claim 1, wherein said alcohol satisfies the following inequality:

$$235 < SP \times MW^{1/2} \leq 20,000.$$

8. The resin material according to claim 1, wherein $R_1$ is a hydroxymethyl group.

9. The resin material according to claim 1, wherein $R_1$ is a methyl group or an ethyl group.

10. The resin material according to claim 1, wherein said atomic group having a hydroxyl group has an ether bond in the atomic group.

11. The resin material according to claim 1, wherein $R_3$ to $R_6$ are each a hydrogen atom or a lower alkyl group.

12. The resin material according to claim 1, wherein $R_3$ to $R_6$ are each a methyl or an ethyl group.

13. The resin material according to claim 1, wherein said composition contains at least two alcohols, and at least one of the alcohols satisfies the following inequalities:

$$sp_i \geq 16, \text{ and } sp_i \times MW_i \geq 280$$

wherein $sp_i$ is a solubility parameter of an alcohol, and $mw_i$ is a molecular weight of an alcohol.

14. The resin material according to claim 13, wherein at least one of the alcohols is a dimer, a trimer, a tetramer or a pentamer of trimethylolpropane.

15. The resin material according to claim 13, wherein at least one alcohol is dipentaerithritol.

16. A resin material according to claim 1, wherein said atomic group is selected from the group consisting of a hydoxyl group, a carbonyl group, a carboxyl group, an amino group, a nitro group, a nitroso group, a sulfinyl group, a sulfonyl group, a phosphino group, and a phosphonyl group.

17. A resin material comprising (a) a resin comprised of a saponified ethylene-vinyl ester copolymer and (b) at least one alcohol having a 1,3-diol structure, said alcohol comprising polytrimethylolpropane, wherein said material satisfies at least one relationship selected from the group consisting of the following relationships (I) and (II)

$$\ln(OTR/22.5) + 4.78 \ln(Fy/Fy') < -0.13, \text{ and } T_2 - T_1 \leq 20 \quad (I)$$

in which

Fy' is a yield strength of a standard saponified ethylene-vinyl acetate copolymer at 60° C.;

Fy is a yield strength of said resin material at 60° C.;

OTR is an oxygen gas permeability (cc/m²·day·atm) of said resin material per a unit thickness of 1 μm at 23° C. and a relative humidity of 0%;

$T_1$ is a haze (%) of a film of said resin material having a thickness of 30 μm after being maintained at 23° C. and a relative humidity of 48% for 48 hours; and $T_2$ is a haze (%) of a film of said resin material having a thickness of 30 μm after being maintained at 40° C. and a relative humidity of 90% for 24 hours; and $$\ln(OTR/22.5) + 0.0698(T_{im} - 157) < -0.06 \quad (II)$$

in which

OTR is an oxygen gas permeability (cc/m²·day·atm) of said resin material per a unit thickness of 1 μm at 23° C. and a relative humidity of 0%, and $T_{im}$ is a melting point of said resin material.

18. A film consisting of a resin material of any one of claims 1 to 4, 5, 6–7, 8–9, 10–13 and 14–15.

19. A multi-layer film comprising at least one layer of a resin material of any one of claims 1 to 4, 5, 6–7, 8–9, 10–13 and 14–15.

20. A film comprising a layer of a resin material of any one of claims 1 to 4, 5, 6–7, 8–9, 10–13 and 14–15, and a thermal bonding layer.

21. The multi-layer film according claim 19 having heat shrinking properties.

22. The resin material according to claim 1, wherein the composition consists essentially of a saponified ethylene-vinyl ester copolymer and at least one 1,3-diol compound represented by the formula:

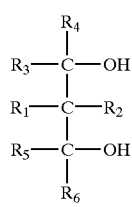

(3)

wherein $R_1$ to $R_6$ are the same or different and represent hydrogen atom or an alkyl group provided that the total atomic weight of atoms constituting $R_2$ is more than that of atoms constituting $R_1$.

23. A film consisting of a resin material of claim 17.

24. A multi-layer film comprising at least one layer of a resin material according to claim 17.

25. A film comprising a layer of a resin material according to claim 17, and a thermal bonding layer.

* * * * *